United States Patent [19]

Bednar

[11] Patent Number: 4,589,142
[45] Date of Patent: May 13, 1986

[54] METHOD AND APPARATUS FOR CHARACTER RECOGNITION BASED UPON THE FREQUENCY OF OCCURRENCE OF SAID CHARACTERS

[75] Inventor: Gregory M. Bednar, Matthews, N.C.

[73] Assignee: International Business Machines Corp. (IBM), Armonk, N.Y.

[21] Appl. No.: 566,636

[22] Filed: Dec. 28, 1983

[51] Int. Cl.$^4$ .............................................. G06K 9/70
[52] U.S. Cl. ...................................... 382/37; 382/34; 382/38; 382/39
[58] Field of Search ...................... 382/32, 30, 34, 39, 382/37, 38

[56] References Cited

U.S. PATENT DOCUMENTS

| | | | |
|---|---|---|---|
| 3,601,802 | 8/1971 | Nakagame et al. | 382/34 |
| 3,675,203 | 7/1972 | Baumann | 382/32 |
| 3,755,780 | 8/1973 | Sammon et al. | 340/146.3 |
| 4,153,897 | 5/1979 | Yasuda et al. | 382/34 |
| 4,157,532 | 6/1979 | Grunwald | 382/32 |
| 4,180,799 | 12/1979 | Smith | 340/146.3 |

OTHER PUBLICATIONS

Goddard et al., "Two-Level Character Recognition Logic", *IBM Tech. Disc. Bulletin*, vol. 22, No. 10, Mar. 1980, p. 4429.

IBM Technical Disclosure Bulletin, vol. 23, No. 8 Jan. 1981, pp. 3663–3664, "Two-Level Character Recognition".

Primary Examiner—Leo H. Boudreau
Assistant Examiner—Joseph Mancuso
Attorney, Agent, or Firm—Bell, Seltzer, Park & Gibson

[57] ABSTRACT

A method and apparatus of processing data is disclosed for recognizing unknown characters of a known character set based in part upon the frequency of occurrence of the characters. The method includes the steps of storing the image data of the unkown characters and then sequentially applying discrete sets of tests capable of first recognizing data and identifying characters having a higher frequency of occurrence. A second stage of discriminatory tests is sequentially applied to the unrecognized data for recognizing data and identifying characters having a lower frequency of occurrence than the first group of characters.

9 Claims, 4 Drawing Figures

| Group | Characters | | | | | | | | | | | Collective Frequency |
|---|---|---|---|---|---|---|---|---|---|---|---|---|
| Group 1 | U | I | N | KA | SHI | YO | KO | TEN | | KI | TSU | TO | 60% |
| | KU | | | | | | | | | | | | |
| Group 2 | SA | SE | RI | TE | O | MA | RO | NA | NI | TA | ZI | NO | 18% |
| | NU | | | | | | | | | | | | |
| Group 3 | CHI | YA | HO | MI | YU | DO | GI | SU | A | RA | KE | HA | 14% |
| | DE | E | WA | | | | | | | | | | |
| Group 4 | PA | PI | PU | PE | PO | GA | GU | GE | GO | ZA | ZU | ZE | 8% |
| | ZO | DA | DI | DU | BA | BI | BU | BE | BO | WO | | | |
| | SO | NU | NE | HI | HE | MU | ME | MO | RU | RE | MARU | | |

Fig. 4

METHOD AND APPARATUS FOR CHARACTER RECOGNITION BASED UPON THE FREQUENCY OF OCCURRENCE OF SAID CHARACTERS

FIELD OF THE INVENTION

This invention relates to optical character recognition and a method of processing the data obtained from an optical scanner to identify the characters or symbols comprising the data. More specifically, it relates to a method of processing the data that optimizes both recognition performance and processing time through the sequential application of discriminatory tests to first recognize characters that have a higher frequency of occurrence.

BACKGROUND OF THE INVENTION

Apparatus and methods of optical character recognition (OCR) have existed for over thirty years. During that time, improvements in OCR capabilities and reliabilities, and reductions in cost, have been primarily the result of improvements in equipment. Methods of processing data for OCR have traditionally recognized unknown characters of a known character set by considering all symbols as being equally important. They commonly utilize techniques which distinguish all possible symbols from all other symbols in a parallel, rather than serial manner.

The present invention describes a new method and apparatus for processing data in which the most frequently occurring symbols are deemed the most important. An ordered sequence of recognition steps is applied to the data representing the unknown characters to first recognize only those characters of a group having a higher frequency of occurrence. Groups of characters having lower frequencies of occurrence are recognized subsequently. It is an ideal method for microprocessor implementation because one may accomplish the same recognition result with fewer steps by distinguishing the data in several small sets of characters instead of the complete set of characters. For instance, by first recognizing a small set of characters having the greatest likelihood or frequency of occurrence, the average number of recognition steps is substantially reduced. This method and apparatus is especially applicable for recognizing character fonts that contain a large number of symbols, such as Japanese Katakana or English text.

Briefly, the method comprises the application of an ordered sequence of independent sets of discriminatory tests that operate and are arranged based on the frequency of occurrence of certain subsets of the character symbols. This is to be compared with the prior art type of tree-style decision logic illustrated in FIG. 2. The prior art tree logic attempts to recognize all symbols with a single recognition logic in a unified process, regardless of how frequently or infrequently each individual symbol occurs in normal language usage. Specifically, the character image data is tested progressively by a series of binary test forming a decision tree, where each test is represented as a node and can be made on individual image bits or collective image data known as measurements or features. The tests continue until a particular character of a defined set of characters has been unambiguously identified, as at node 27. Data not identified continues down the tree until it is identified or a reject code is generated signifying that the data was not recognized. Further, more comprehensive tests can then be applied, again attempting to distinguish among all possible characters. The design of such a decision tree logic system, the method of processing the data, and the equipment implementing such a method increases exponentially in cost and complexity with increases in the recognition rate and recognition accuracy. Further, it is an inherent characteristic of the tree-style decision logic that it is keyed to the characteristics of the entire population of characters, rather than discrete subsets thereof. Each succeeding test is dependent upon the preceding test in an attempt to recognize all characters in the set as opposed to recognizing only a subset of characters based upon their frequency of occurrence. Thus, one may expend a disproportionate amount of computing time or utilize a disproportionate amount of equipment distinguishing among characters having a low frequency of occurrence, which seriously degrades the utilization efficiency of the machine without any significant improvement in the recognition rate, accuracy or performance. An example of such a tree-style logic is disclosed in IBM Technical Disclosure Bulletin Vol. 23, No. 8, January 1981.

The present invention utilizes a novel ordered sequence of recognition logic sets rather than the parallel arrangement found in the typical tree-style decision logic. Each logic set is uniquely tailored to recognize the characteristics of only a select population or subset of all of the characters. Thus, each set of tests is not dependent upon the preceding set of tests and is not required to take into account all of the characteristics of the entire population of characters. This optimizes both recognition performance and processing time.

In addition, for character sets having a large number of symbols this method and apparatus provides a convenient means of decomposing the recognition problem into subsets of smaller problems from which optimum benefit may be obtained. The smaller recognition sets also allow the recognition problem to become a more manageable task for the designer of the recognition logic, and dramatically decreases the number of recognition steps. Thus, this method permits the application of a multiplicity of independent character recognition logic sets uniquely adapted to identify controlled subsets of the entire character set. Thus, one may optimize equipment use and processing time to obtain a higher recognition rate of the more frequently occurring characters in a shorter length of time. By freeing the recognition logic from the constraints imposed in the prior art tree-style decision logic, the amount of logic is minimized while focusing the recognition efforts on the most frequently occurring characters. Moreover, the recognition accuracy and throughput is increased without an increase in storage area. Further advantages include the use of simpler and discrete recognition logic sets rather than a seemingly endless and interrelated set of cascaded tests. Therefore, one may optimize the various logic sets to recognize differing subsets with the bulk of the effort concentrated on those characters most frequently occurring. For instance, the accuracy of the recognition rate for the more frequently occurring characters may be improved by including additional tests that are not necessary or desirable to improve the accuracy of the recognition rate for the less frequently occurring characters.

Further advantages include the ability to tailor the method of processing to specific needs. For instance, while the letters X, Y and Z may be among the least frequently occurring characters when the English language is used for everyday communication, those letters may be among the most frequently used in scientific or mathematical applications. The method of the present invention has the flexibility to accommodate such changes. To further enhance the method and apparatus of the present invention, the concatenation of the recognition logic sets may occur in either or both the horizontal and vertical directions. Accordingly, it is an object of the present invention to provide a method and apparatus for processing data that improves optical character recognizing efficiencies through improvements in accuracy and speed of throughput.

It is a further object of the present invention to provide a method and apparatus for processing data that recognizes unknown characters of a known character set based in part upon the frequency of occurrence of the characters.

It is a further object of the present invention to provide a method and apparatus for processing data for recognizing unknown characters of a known character set by applying a series of discrete stages of discriminatory tests to recognize the image data.

SUMMARY OF THE INVENTION

The present invention is for a method and apparatus of processing data for recognizing unknown characters of a known character set based in part upon the frequency of occurrence of the characters. The method comprises the steps of storing the image data of the unknown characters and then applying a first set of discriminatory tests to identify whether the data belongs to a first group of characters and recognize the image data. The first group of characters has a higher frequency of occurrence and contains less than all of the characters. A second set of tests is sequentially applied to the unrecognized character data to similarly recognize and identify the image data, but as belonging to a second group of characters having a lower frequency of occurrence than the first group of characters.

DESCRIPTION OF THE DRAWINGS

FIG. 4 is a table illustrating the frequency of occurrence of Japanese Katakana characters.

DESCRIPTION OF THE INVENTION

Figure 1:
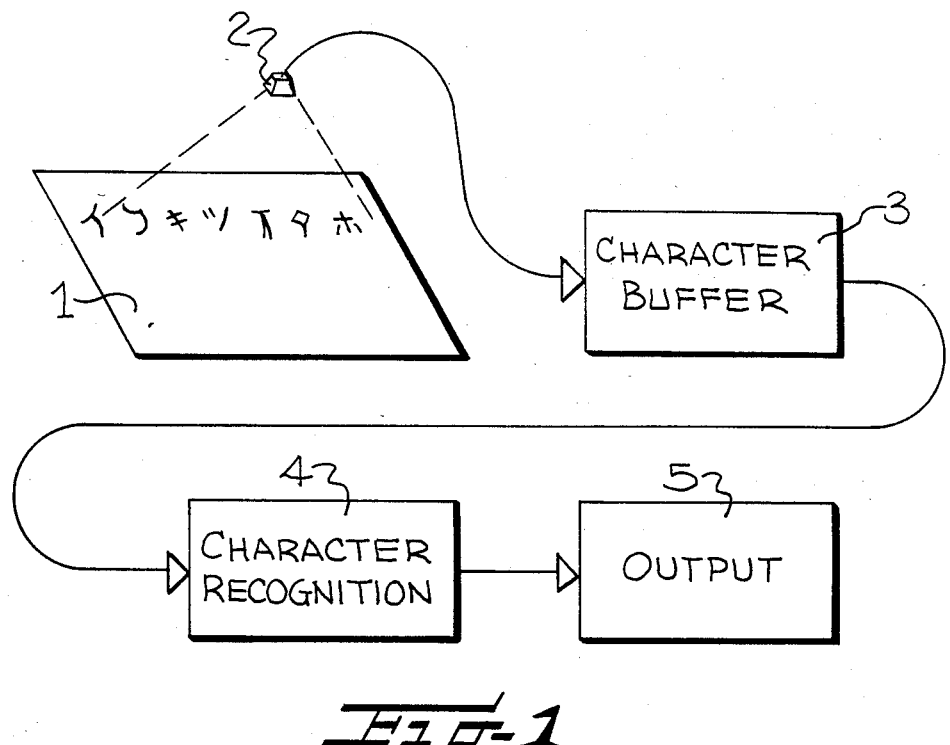
FIG. 1 is a block diagram illustrating a typical optical character recognition apparatus and the sequence of steps for processing the data.

Referring to FIG. 1, a schematic diagram of the method of the present invention reflects the generation by an optical scanner of data representing the unknown characters. The scanner is of a known construction and operation. It typically scans a document 1 exhibiting unknown characters in a direction parallel to the direction of reading. FIG. 1 illustrates a horizontal scan of a line of characters. The scanner 2 examines the entire length of the document by moving either the document or the scanner mechanism, and the entire width of the document by selecting a field of view of appropriate width. The generated scan data is provided to a character buffer 3 for retention and transfer to the character recognition apparatus 4.

The character recognition apparatus applies the various ordered sequences of discriminatory logic tests for recognizing the image data as individual characters. The output 5 from the character recognition apparatus typically indicates that the image data representing a particular character has been recognized or that it has failed to recognize the information, thereby generating a reject or error code.

Figure 2:
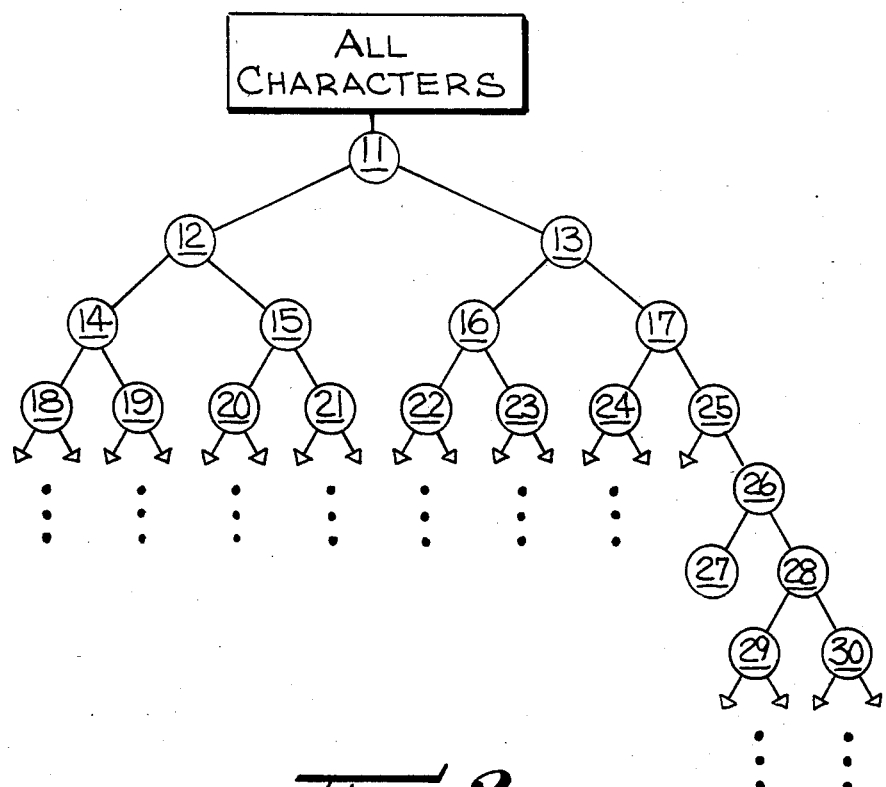
FIG. 2 illustrates a typical tree-style decision logic as found in the prior art that is designed to recognize all symbols regardless of how frequently they occur.

Referring to FIG. 2, a portion of a typical prior art tree-style decision logic is illustrated. Image data representing an unknown character is provided to the apex of the tree logic, i.e. node 11, and a series of logic tests is applied, as represented by nodes 11-30. (Only a representative sample of the nodes is identified.) As explained earlier, such logic employs sufficient discriminatory tests that evaluate the image data to relate its characteristics to one possible output character as distinguished from all possible other characters in the known character set. The number of tests required is an exponential function of the number of possible output characters to be distinguished among. Thus, one expends a great amount of processing time and energy to distinguish every unknown character from all possible candidates to be able to recognize the characters which occur only rarely.

FIG. 2 also illustrates how each succeeding decision is dependent upon the preceding decision with regard to recognizing all characters in the set as opposed to recognizing only a subset of characters based upon their frequency of occurrence. The dots indicate the continuation of the decision logic forming the "branches" of the logic tree. Only the lowermost branches are indicated as continuing, but it should be understood that all branches may extend as necessary.

Figure 3:
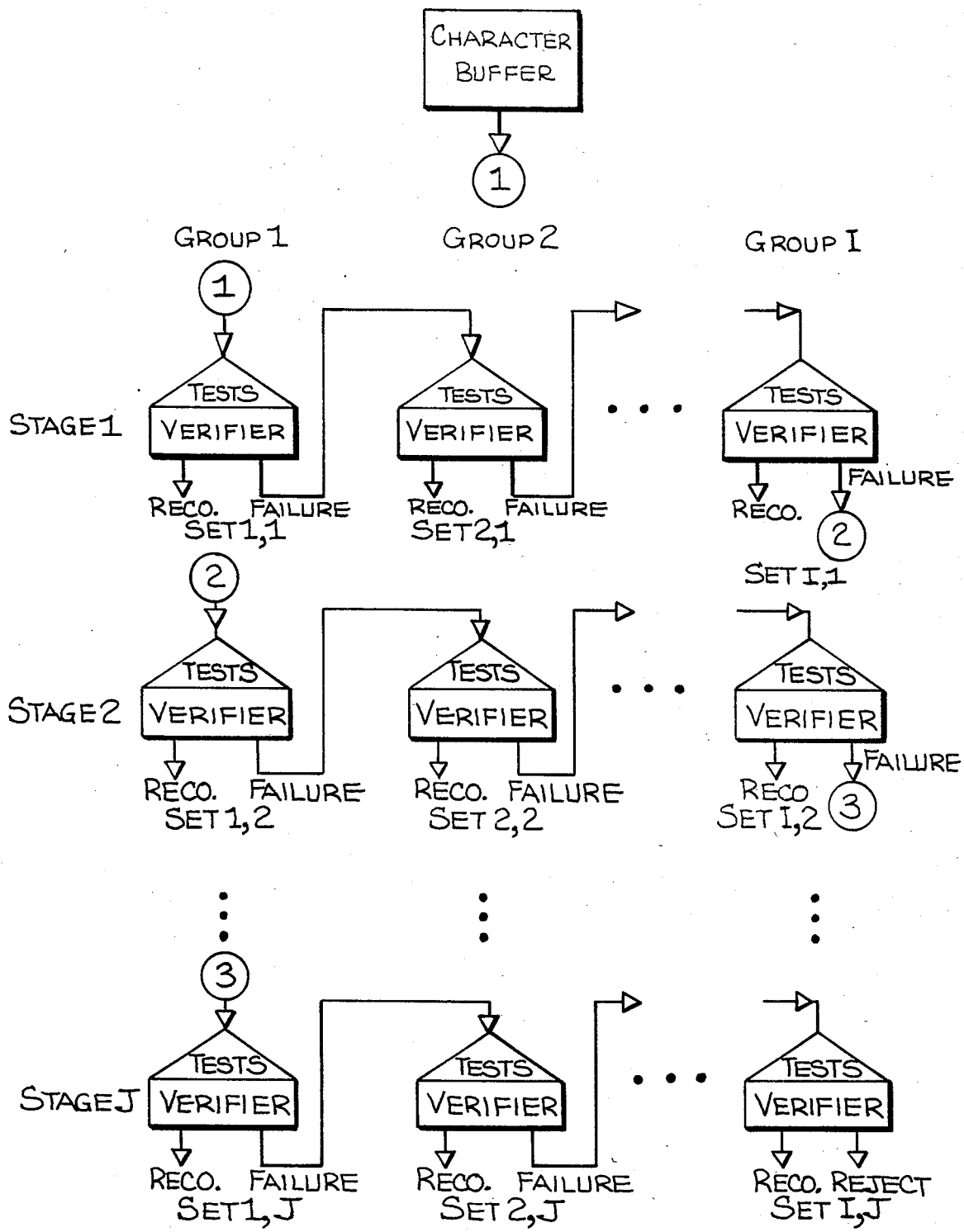
FIG. 3 illustrates a method of processing data of the present inventon showing the various stages and groups sequentially arranged for recognition of the data.

Referring to FIG. 3, the method of processing data for the present invention utilizes a concatenation of discrete sets of logic tests. As illustrated, the method includes the serial application of discrete "Sets" of logic tests. A horizontal row of Sets may be identified as a "Stage" and a vertical column of Sets may be identified as a "Group."

The individual logic Sets within each Stage are arranged in a sequential order based upon the frequency of the character subsets recognized by each Set. For example, Set 1,1 recognizes only the most frequently occurring symbols in the character set. Set 2,1 recognizes only those symbols occurring with the next highest frequency. Similarly, subsequent Sets, such as Set I,1 recognize symbols with lesser frequencies of occurrence. This may continue until all characters have been included. The image data representing the unknown characters is provided to Set 1,1 and the discriminatory tests of Set 1,1 are applied to the data. An optional verifier may be used as necessary or desirable to confirm the output generated by the tests. The tests identify whether the image data belongs to a first group of characters having a higher frequency of occurrence and recognize the image data as characters. The data representing recognized characters exits at RECO and the data representing unrecognized characters exits at FAILURE and continues to Set 2,1. The data representing unrecognized characters may include data representing characters that could have been recognized but were not, due to noise or the like, and data representing characters that are to be identified by subsequent Sets but not the present Set.

At Set 2,1, a succeeding collection of discriminatory tests independent of the tests of Set 1,1 is applied to the unrecognized image data. These tests identify whether the unrecognized data belongs to a second group of characters having a lower frequency of occurrence than the first group of characters and recognize the data as characters. As before, the data representing recognized characters exits at RECO and the data representing unrecognized characters exits at FAILURE and continues. This sequential application of discriminatory tests may continue as necessary or desirable. For instance, one may include a series of Sets in Stage 1 sufficient to recognize all of the characters of a particular character set.

The above method and organization have several advantages. First, the characters that are recognized in Set 1,1 exit the recognition method and apparatus in the least amount of time. Since these are the most frequently occurring characters, this minimizes the utilization of the microprocessor or other apparatus while optimizing the recognition rate. Second, since Set 1,1 may be tailored to include more recognition logic per symbol than the Sets for less frequently occurring characters, the recognition performance and accuracy of Set 1,1 may be increased. Since this Set recognizes the most frequently occurring characters, the overall recognition rate of the total structure is optimized. Thirdly, it is necessary only to perform the amount of computation necessary to recognize the individual character image data and not attempt to recognize all other possible characters that the image data might represent.

Referring again to FIG. 3, the method of processing may include the application of several Stages of logical tests in an ordered sequence, with each Stage comprised of a series of Sets. Each Stage sequentially applies logical tests that are different than those applied in the first or preceding Stage, and the tests or sets of each Stage may be tailored to first recognize those characters that have the highest frequency of non-recognition after the application of all of the Sets of tests in Stage 1. For instance, assuming that Stage 1 comprises I Sets, the I Sets may together identify all characters of a character set. All Sets of the first Stage may be designed to utilize certain techniques to recognize these characters. Since it is likely that some data, or characters, will remain unrecognized even after it has traversed the entire Stage, the data is then supplied to a second Stage of sequential tests, i.e., Set 1,2, Set 2,2, . . . Set 1,2, in a further attempt to identify the characters from the image data. The Sets of discriminatory logic tests of Stage 2 are designed specifically to recognize the failed character patterns from Stage 1 and may utilize logic of a different approach to optimize recognition of the characters represented by this data. As further illustrated in FIG. 3, the number of Stages utilized may vary as necessary or desirable to meet a desired recognition objective. Thus, the Sets and Stages may be optimized to obtain the desired recognition rate, yet meet constraints on recognition costs and equipment. Further advantages include the flexibility and ability to tailor each Stage and Set to identify certain characters, or to utilize wholly independent approaches in an attempt to identify a character that was not recognized by an earlier Set or Stage or Group.

Referring to FIG. 4, the collective frequency of occurrence of Japanese Katakana character groupings is illustrated based upon their usage in Japanese names. It is to be understood that although Japanese Katakana characters are illustrated, the present invention may be utilized with any alphabet or defined set of characters. Group 1 comprises fourteen characters that together have a collective frequency of sixty percent. Group 2 comprises thirteen characters that have a collective frequency of eighteen percent. Group 3 comprises fifteen characters that have a collective frequency of fourteen percent. Group 4 comprises thirty-six characters that have a collective frequency of eight percent. By optimizing the method of processing to improve the recognition rate of the most frequently occurring characters, i.e. those in Group 1, the effective recognition performance may be enhanced with the least effect upon cost. Moreover, this may be done independently of the Sets of discriminatory logic tests utilized to identify the Japanese characters in Groups 2, 3 and 4. This is illustrated in the following table using an assumed recognition rate for each Group:

| Group | Number of Characters | Recognition Rate | Frequency | Effective Performance |
|---|---|---|---|---|
| 1 | 14 | 87% | .60 | 52.2% |
| 2 | 13 | 84% | .18 | 15.1% |
| 3 | 15 | 78% | .14 | 10.9% |
| 4 | 36 | 60% | .08 | 4.8% |
| | | | Total | 83% |

The foregoing provides a total recognition percentage of $(87 \times 0.6) + (84 \times 0.18) + (78 \times 0.14) + (60 \times 0.08) = 83$ percent. Thus, by improving the recognition rate of the characters in Group 1, one may have a more significant improvement in the effective recognition performance than by improving the recognition rate of the characters in Group 4.

Having determined which character data will be tested for recognition by which Stage or Set, the task of developing the necessary discriminatory tests is well within the abilities of one skilled in the art of computer programming or optical character recognition. It includes the use of known techniques to differentiate data representing one character from data representing a different character.

The apparatus for implementing the invention may include a microprocessor or other computer capable of implementing logical decisions.

In the drawings and description, there has been set forth an exemplary embodiment of the invention. It should be understood that while specific terms are used, they are employed in a generic and descriptive sense only and are not for purposes of limitation.

I claim:

1. A method of processing electric image data for recognizing unknown characters of a known character set based upon the frequency of occurrence of said characters, said method comprising the steps of:
   converting the information representing the unknown characters into electric image data;
   storing the image data of unknown characters;
   segregating into at least two independent and discrete sets discriminatory logic tests for recognizing the stored image data, the first set of logic tests for recognizing the data representing a first subset of the known character set, the first subset being characters having the highest frequency of occurrence and containing less than all of the characters of the complete character set, and the second set of logic tests for recognizing a second subset of the known character set, the second subset being characters having a lower frequency of occurrence than said first subset and containing at least some characters not in the first subset of characters;

applying the first set of discriminatory logic tests to the stored image data for recognizing only the image data that belongs to the first subset of characters; and sequentially applying the second set of discriminatory logic tests to the image data not recognized by the application of the first set of discriminatory logic tests, the second set of logic tests being applied independently of the first set of logic tests for recognizing only the image data that belongs to the second subset of characters.

2. The method of claim 1 further comprising the step of sequentially applying to any image data not recognized by the application of the second set of discriminatory logic tests, at least one additional set of discriminatory tests, each additional set of discriminatory logic tests being applied independently of the other sets of discriminatory logic tests for recognizing only the unrecognized image data that belongs to an additional subset of characters and recognizing only the image data that belongs to each additional subset of characters, each succeeding additional subset of characters having a lower frequency of occurrence than each preceding subset of characters.

3. The method of claim 1 wherein the application of each of the sets of a discriminatory logic tests comprises applying a discriminatory binary tree logic and sequentially applying a verifier logic.

4. A method of processing electric image data for recognizing unknown characters of a known character set based upon the frequency of occurrence of said characters, said method comprising the steps of:
converting the information representing the unknown characters into electric image data;
storing the image data of unknown characters;
segregating into at least two independent and discrete stages discriminatory logic tests for recognizing the data representing all characters of the known character set, each stage including multiple discrete sets of discriminatory logic tests for recognizing the data representing discrete subsets of the known character set;
applying the first stage of discriminatory logic tests to the stored image data for recognizing all the image data as characters and generating recognized character data and unrecognized character data, wherein the application of the discrete sets of discriminatory logic tests of the first stage of discriminatory tests includes applying the first set of discriminatory logic tests for recognizing only the image data that belongs to the first subset of characters, the first subset of characters having the highest frequency of occurrence and containing less than all of the characters of the complete character set; and
sequentially applying a second stage of discriminatory logic tests independently of the first stage of discriminatory logic tests to only the unrecognized character data, the sequential application of the second stage of discriminatory logic tests including sequentially applying discrete sets of independent discriminatory logic tests different from the discriminatory logic tests applied in the first stage of discriminatory logic tests.

5. The method of claim 4 wherein the application of the discrete sets of discriminatory logic tests of the first stage of discriminatory tests further includes:
sequentially applying to the unrecognized image data a second set of discriminatory logic tests for recognizing only the unrecognized image data that belongs to a second subset of characters, the second subset of characters having a lower frequency of occurrence than the first subset of characters and containing at least some characters not in the first subset of characters.

6. Apparatus for processing electric image data for recognizing unknown characters of a known character set based upon the frequency of occurrence of said characters, said apparatus comprising:
means for converting the information representing the unknown characters into electric image data;
means for storing the image data of unknown characters;
means for segregating into at least two independent and discrete sets discriminatory logic tests for recognizing the stored image data, the first set of logic tests for recognizing the data representing a first subset of the known character set, the first subset being characters having the highest frequency of occurrence and containing less than all of the characters of the complete character set, and the second set of logic tests for recognizing a second subset of the known character set, the second subset being characters having a lower frequency of occurrence than said first subset and containing at least some characters not in the first subset of characters;
means for applying the first set of discriminatory logic tests to the stored image data for recognizing only the image data that belongs to the first subset of characters; and
means for sequentially applying the second set of discriminatory logic tests to the image data not recognized by the application of the first set of discriminatory logic tests, the second set of logic tests being applied independently of the first set of logic tests for recognizing only the image data that belongs to the second subset of characters.

7. The apparatus of claim 6 further comprising means for applying at least one additional set of discriminatory tests to any unrecognized data from the application of the second set of discriminatory logic tests, each additional set of discrimatory logic tests being applied independently of the other sets of discriminatory logic tests for recognizing only the unrecognized image data that belongs to an additional subset of characters and recognizing only the image data that belongs to each additional subset of characters, each succeeding additional subset of characters, having a lower frequency of occurrence than each preceding subset of characters.

8. Apparatus for processing electric image data for recognizing unknown characters of a known character set based upon the frequency of occurrence of said characters, said apparatus comprising:
means for converting the information representing the unknown characters into electric image data;
means for storing the image data of unknown characters;
means for segregating into at least two independent and discrete stages discriminatory logic tests for recognizing the data representing all characters of the known character set, each stage including multiple discrete sets of discriminatory logic tests for recognizing the data representing discrete subsets of the known character;

means for applying the first stage of discriminatory logic tests to the stored image data for recognizing all the image data as characters and generating recognized character data and unrecognized character data, wherein the means for applying the discrete sets of discriminatory logic tests of the first stage of discriminatory tests includes means for applying the first set of discriminatory logic tests for recognizing only the image data that belongs to the first subset of characters, the first subset of characters having the highest frequency of occurrence and containing less than all of the characters of the complete character set; and means for sequentially applying a second stage of discriminatory logic tests independently of the first stage of discriminatory logic tests to only the unrecognized character data, the means for applying the second stage of discriminatory logic tests including means for sequentially applying discrete sets of independent discriminatory logic tests different from the discriminatory logic tests applied in the first stage of discriminatory logic tests.

9. The apparatus of claim 8 wherein the means for applying the discrete sets of discriminatory logic tests of the first stage of discriminatory tests further includes:

means for sequentially applying to the unrecognized image data a second set of discriminatory logic tests for recognizing only the unrecognized image data that belongs to a second subset of characters, the second subset of characters having a lower frequency of occurrence than the first subset of characters and containing at least some characters not in the first subset of characters.

* * * * *